United States Patent [19]

Weisburn et al.

[11] Patent Number: 5,211,283
[45] Date of Patent: May 18, 1993

[54] COMPACT DISC SECURITY PACKAGE WITH ORIENTING TABS

[75] Inventors: James T. Weisburn, Massillon; John P. Hoerger, Minerva, both of Ohio

[73] Assignee: Alpha Enterprises, Inc., East Canton, Ohio

[21] Appl. No.: 826,477

[22] Filed: Jan. 27, 1992

[51] Int. Cl.$^5$ .................. B65D 85/67; B65D 85/57
[52] U.S. Cl. .................................. 206/1.5; 206/309; 206/387
[58] Field of Search .................. 206/1.5, 309, 387, 493

[56] References Cited

U.S. PATENT DOCUMENTS

| | | |
|---|---|---|
| 4,589,549 | 5/1986 | Hehn . |
| 4,702,369 | 10/1987 | Philosophe . |
| 4,760,914 | 8/1988 | Gelardi et al. . |
| 4,793,480 | 12/1988 | Gelardi et al. . |
| 4,805,769 | 2/1989 | Soltis et al. . |
| 4,819,797 | 4/1989 | Holmgren . |
| 4,834,238 | 5/1989 | Hehn et al. . |
| 4,865,190 | 9/1989 | Gregerson et al. ............ 206/309 |
| 5,031,756 | 7/1991 | Buzzard et al. . |

FOREIGN PATENT DOCUMENTS 0312172 4/1989 European Pat. Off. .

Primary Examiner—Bryon P. Gehman
Attorney, Agent, or Firm—Michael Sand Co., L.P.A.

[57] ABSTRACT

A reusable plastic package for securely holding and displaying a compact disc. A housing forms a storage compartment having an access opening for receiving and retaining therein a plastic storage box containing a compact disc. A slide plate is mounted on the housing and is slidably moved across the access opening between locked and unlocked positions to retain the box within the storage compartment. The slide plate has locking projections which engage locking tabs on the housing to maintain the slide plate in locked position until released by a manually operated key. A pair of orienting tabs are formed on the slide plate and move through openings formed in a rear wall of the storage compartment and into offset openings formed in the compact disc storage box when the slide plate is moved to the locked position to ensure that the storage box is oriented in the desired position in the storage compartment for viewing of graphics cards contained thereon.

5 Claims, 3 Drawing Sheets

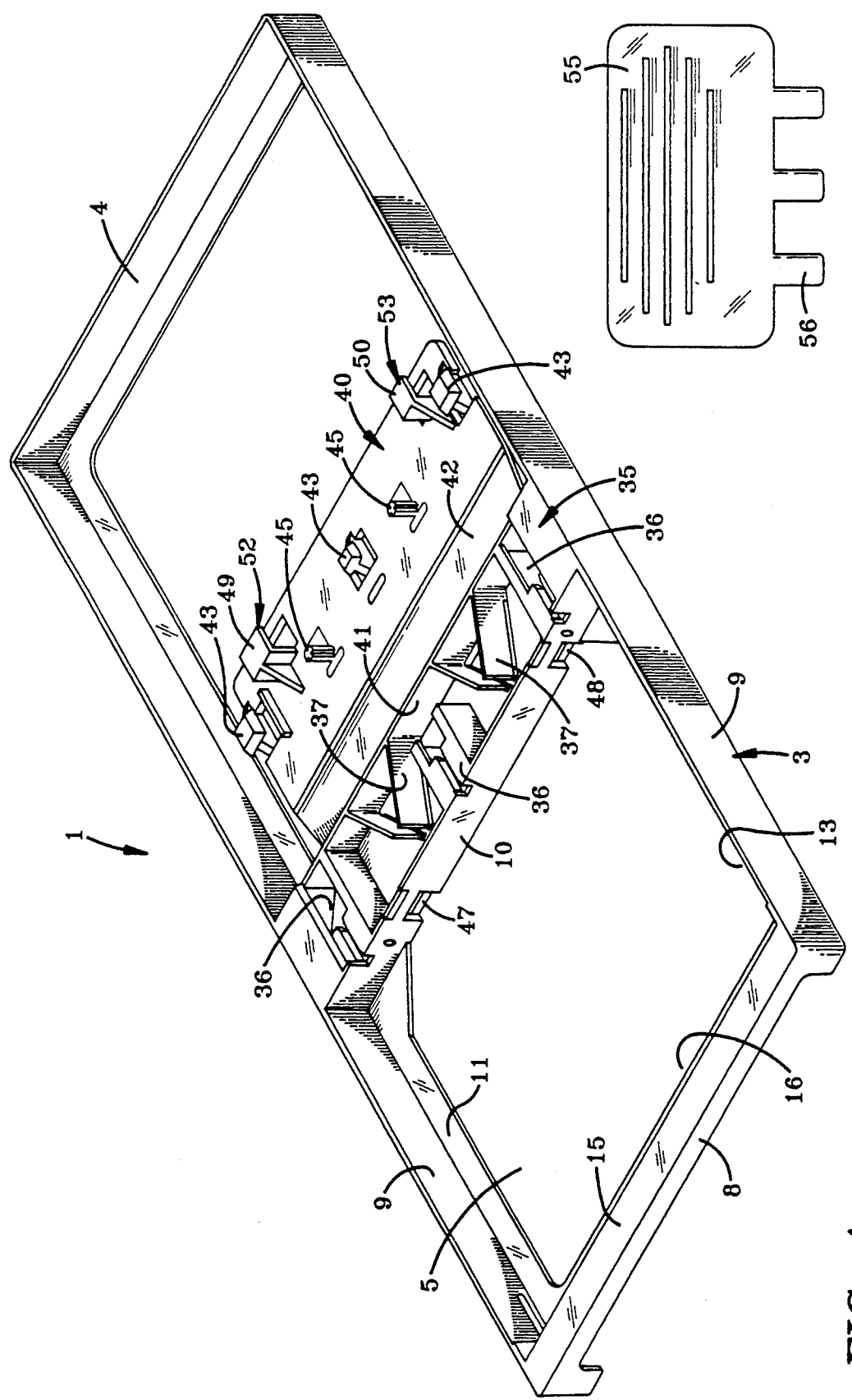

COMPACT DISC SECURITY PACKAGE WITH ORIENTING TABS

BACKGROUND OF THE INVENTION

1. Technical Field

The invention relates to packages and particularly to a package for holding a compact disc. More particularly, the invention relates to a reusable security package having a slide lock which prevents unauthorized removal of the compact disc storage box containing the compact disc from within the package; and in which the slide lock has tabs thereon which engage slotted openings formed in the compact disc storage box to ensure that the box is correctly positioned in the storage compartment to enable a perspective viewer to properly view the graphics on the compact disc box.

2. Background Information

Compact discs (CDs) is a relatively new form of recording media which is growing in popularity with increasing sales of compact disc players. The compact discs are thin flexible plastic resin sheets with a digitally recorded engraved pattern and resemble small vinyl photograph records and are operated by a laser enclosed in a compact disc player. Compact discs are relatively small and are usually more expensive than the heretofore used audio tapes and 8-track tapes, and thus are more susceptible to theft when displayed for sale in a retail store outlet.

Various types of housings and security packages have been developed to provide a safe and secure device for displaying the CDs while retarding unauthorized removal of the CD from the display package and subsequent theft from the store. Examples of such security packages are shown in U.S. Pat. Nos. 4,760,914 and 4,805,769. The compact discs generally are retained within a plastic box commonly referred to as a "jewel box" to protect the disc from scratching and damage and to provide a protective storage container for the disc when not in use. It is desirable that these plastic storage boxes be retained in the larger package for display to prevent theft of the smaller plastic storage box containing the CD.

These CD storage boxes usually are formed of clear plastic material and will contain paper or cardboard cards which have various printed indicia usually on one side thereof, to indicate the contents recorded on the CD. It is desirable that these graphics be properly oriented when the storage box is retained in a security package so that customers when looking through a storage rack containing a plurality of such packages, will always have the graphics presented in the correct orientation for ease of reading to facilitate the sale of the CDs. However, a problem arises is that in many instances the storage box containing the CDs when placed in the outer security package, is not placed in the correct oriented position. Thus when a plurality of the security packages are arranged in a display device, the graphics will be out of orientation making it difficult for the customer to properly see the contents of the stored CD.

These plastic CD storage boxes may be of the type shown in U.S. Pat. Nos. 4,702,369, 4,771,883 and 4,793,480 and usually are formed with a plurality of elongated openings in at least one or two side walls thereof, which are formed during the molding process in order to provide inwardly extending tabs for retaining a CD storage base having a circular recess therein. Others have used these storage box slots for locking the pivotally mounted lid of the box in a locked position and for retaining the storage box within an outer security package such as shown in U.S. Pat. No. 4,819,797 and in European Patent Application 0 312 172. However, the packages which use these storage box slots for security purposes do not ensure that the graphics contained therein are properly oriented when the CD storage box is placed within the outer security package.

Therefore, the need exists for an improved security package for containing a CD storage box and CD in a secured position, yet which ensures that the storage box is at the proper orientation within the outer security package, so that the display graphics contained within the storage box is in the proper oriented position for ease of viewing when a plurality of the security packages are placed in a display case or rack.

SUMMARY OF THE INVENTION

Objectives of the invention include providing an improved compact disc security package with orienting tabs to ensure that the plastic storage box containing a CD is properly oriented within the storage compartment of the security package for easy viewing of the display graphics contained therein by a perspective purchaser.

Another objective is to provide such a security package in which the orienting tabs are formed as part of the locking mechanism and prevent the locking mechanism from moving to the locked position unless the orienting tabs are received within openings formed in the storage box to ensure that the storage box is properly oriented within the storage compartment of the security package.

A further objective is to provide such an improved security package in which the orienting tabs can be formed relatively inexpensively on the slide plate of an existing security package thereby not appreciably increasing the cost of the package while achieving the desired advantages; and in which the orienting tabs do not interfere with the unlocking of the slide plate by a manually operated key.

Another objective of the invention is to provide such a security package in which the orienting tabs can be formed on various styles of existing CD security packages with minor modification thereto, thereby eliminating a complete redesign of the security package and increased tooling costs which would be associated therewith.

A still further objective is to provide such a security package which is of a simple construction, which achieves the stated objectives in a simple, effective and inexpensive manner, and which solves problems and satisfies needs existing in the art.

These and other objectives and advantages of the invention are obtained by the improved security package of the invention used for securely holding a storage box containing a compact disc in a properly oriented position within the security package, the general nature of which may be stated as including a main housing having a plurality of walls forming a storage compartment therebetween and forming an access opening for inserting and removing the storage box containing a compact disc into and out of the compartment; lock means for releasably securing the storage box in the storage compartment, said lock means including a slide plate slidably mounted on the housing and movable between locked and unlocked positions, said slide plate when in locked position extends over a portion of the access opening to prevent removal of the storage box from the storage compartment, and locking projections engageable with the slide plate for retaining the slide plate in locked position; tab means formed on the slide plate and movable into the storage compartment when the slide plate is moved to a locked position for engagement with the storage box to properly orient the box in a desired relationship with respect to the storage compartment; and key means engageable with the locking projections for moving said projections out of engagement with the slide plate enabling said slide plate to be moved to the unlocked position.

BRIEF DESCRIPTION OF THE DRAWINGS

A preferred embodiment of the invention, illustrative of the best modes in which applicants have contemplated applying the principles, is set forth in the following description and is shown in the drawings and is particularly and distinctly pointed out and set forth in the appended claims.

FIG. 1 is a perspective view of the improved CD security package with the slide lock plate thereof being shown in a fully open, unlocked and unlatched position;

FIG. 7 is a plan view of a type of manually operated key for unlocking the security package shown particularly in FIGS. 1—3.

Similar numerals refer to similar parts throughout the drawings.

DESCRIPTION OF THE PREFERRED EMBODIMENT

Figure 3:
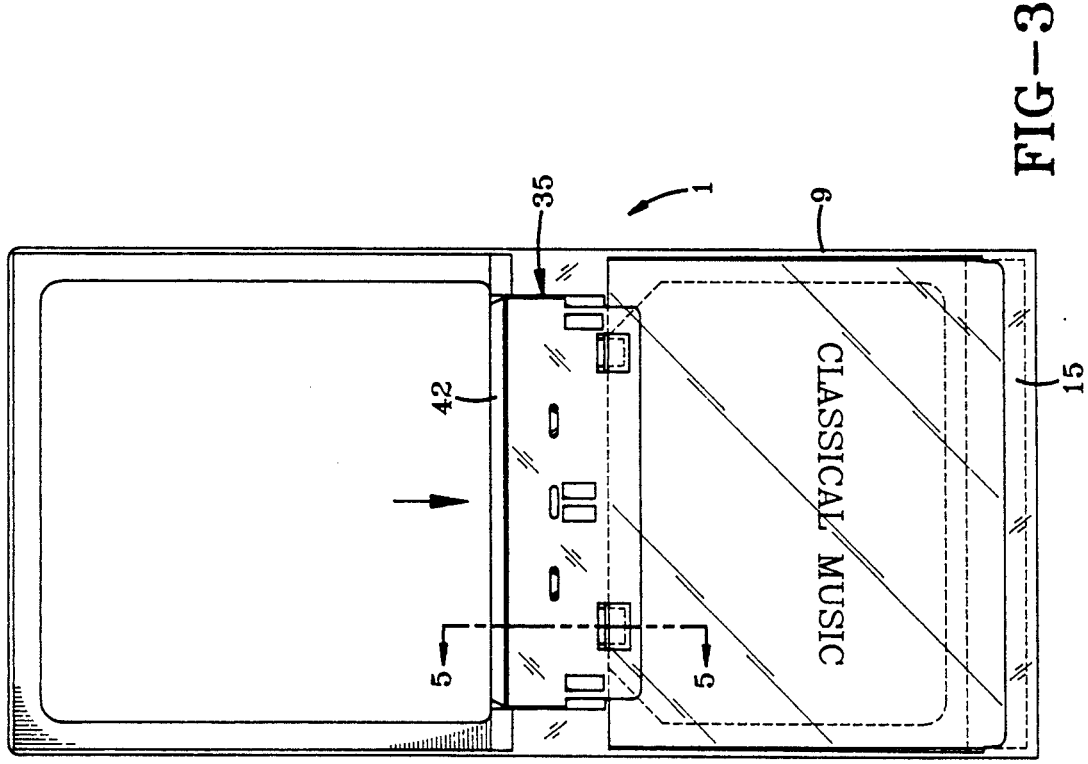
FIG. 3 is a top plan view similar to FIG. 2 with the slide plate in locked position retaining a CD storage box within the storage container.
Figure 2:
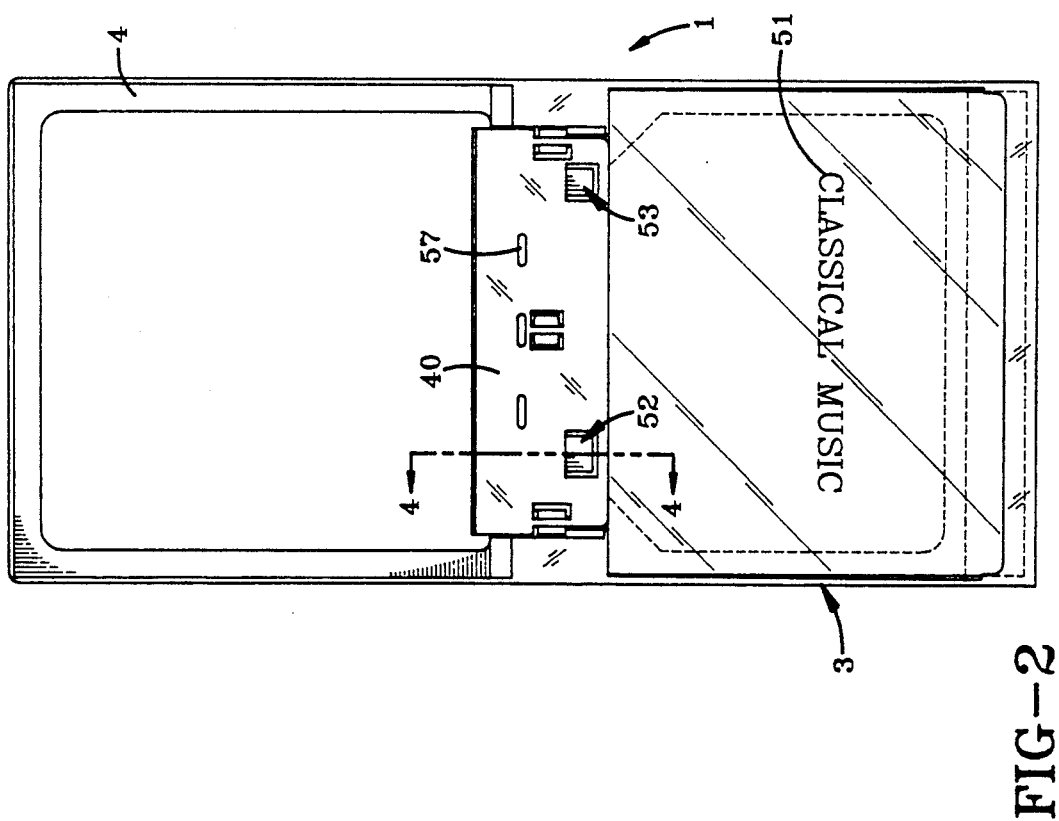
FIG. 2 is a top plan view of the security package of FIG. 1 with the locking slide plate shown in the unlocked position.

The improved security package of the present invention is indicated generally at 1, and is shown particularly in FIGS. 1-3. Security package 1 preferably is of the type shown in U.S. Pat. No. 4,834,238, the contents of which are incorporated herein by reference.

Figure 6:
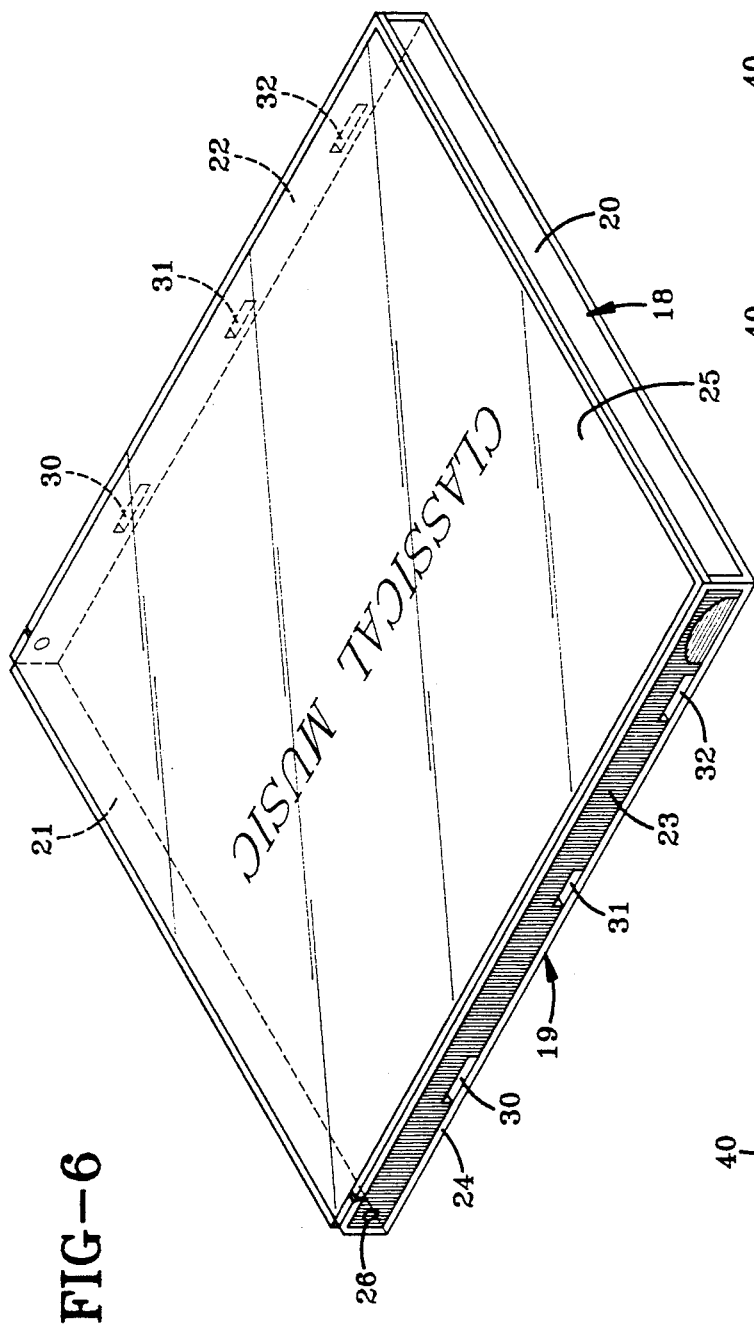
FIG. 6 is a perspective view showing a usual type of compact disc storage box used with the security package of the present invention.

Package 1 preferably is formed as a one-piece molded plastic member, preferably molded of high-impact polypropylene or other suitable moldable plastic. Package 1 includes a housing indicated generally at 3, having a generally rectangular shape, and having a hanger end 4 formed on the opposite end of a storage compartment 5. Compartment 5 is formed by a front wall 8, a pair of spaced parallel sidewalls 9, a rear wall 10 and a bottom wall 11. A generally rectangular-shaped cutout 13 is formed in bottom wall 11 to enable the display graphics on a compact disc storage box 18 (FIG. 6) to be easily seen therethrough. A top flange 15 projects inwardly from the top of end wall 8 and serves as a retaining lip for the front upper edge of CD storage box 18 when inserted into storage compartment 5 through a top access opening 16. Opening 16 provides for the insertion and removal of storage box 18 into and from storage compartment 5.

Storage box 18 is of a usual construction well known in the art and is formed of clear plastic material and includes a one-piece base 19 formed by spaced parallel front and rear walls 20 and 21, and a bottom wall 24. A lid 25 is pivotally mounted by pins 26 onto base 19 for pivotal movement between open and closed positions for placement and removal of a compact disc within a circular recess (not shown) formed in a storage tray contained therein. Examples of such storage boxes, referred to as "jewel boxes" are shown in U.S. Pat. Nos. 4,702,369, 4,760,914 and 4,793,480. Lid 25 includes a pair of spaced parallel sidewalls 22 and 23 formed with a plurality of spaced rectangular-shaped elongated openings 30, 31 and 32. These openings are formed during the molding of the storage box for the formation of tabs which retain the graphics within base 19.

Referring again to FIGS. 1—3, security package 1 further includes a lock housing portion indicated generally at 35, which includes three T-shaped slide channels 36 and two pairs of angled flexible locking tabs 37. A slide locking plate 40, is pivotally mounted on a rear wall 41 of shaped slide projections 43 are formed on the underside surface of locking plate 40 and are slidably engaged in T-shaped slide channels 36. A pair of locking projections 45 project downwardly from the underside surface of slide plate 40 and engage flexible locking tabs 37 to retain slide plate 40 in its forward locked position as shown in FIG. 3 and fully described in U.S. Pat. No. 4,834,238 referenced above.

In accordance with the invention, a pair of openings 47 and 48 are formed in storage compartment end wall 10 which also is the front wall of lock housing 35, and are adapted to receive therethrough forward legs 49 and 50 of a pair of orienting tabs 52 and 53, respectively. Tabs 52 and 53 are formed on the bottom surface of slide plate 40 and project downwardly therefrom. Tabs 52 and 53 are generally L-shaped, and each includes a diagonally extending reinforcing flange 54 (FIGS. 4 and 5) to stiffen orienting legs 49 and 50. Orienting tabs 52 and 53 are located within lock housing portion 35.

Figure 5:
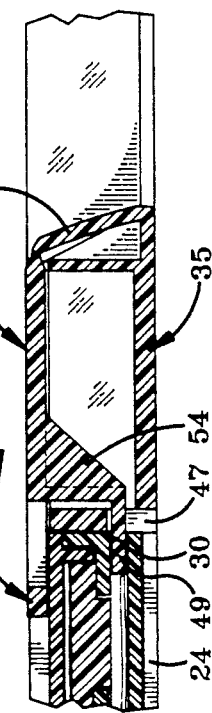
FIG. 5 is an enlarged fragmentary sectional view taken on line 5—5, FIG. 3.
Figure 4:
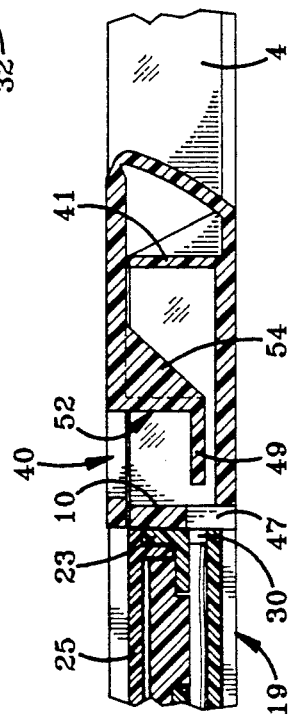
FIG. 4 is an enlarged fragmentary sectional view taken on line 4—4, FIG. 2.

The operation, features and advantages of security package 1, and in particular the operation of orienting tabs 52 and 53, is best understood by reference to FIGS. 4 and 5. Storage box 18 containing a CD disc will contain graphics printed on a paper card or cards 51 usually mounted within lid 25 so as to be visible through top access opening 16 and bottom wall cutout 13.

When slide plate 40 is in the unlocked position of FIGS. 2 and 4, storage box 18 will be inserted into storage compartment 5 through top access opening 16. After storage box 18 is seated within storage compartment 5, slide plate 40 will be slid forwardly from its unlocked position of FIG. 2 to that of FIGS. 3 and 5. During the forward sliding movement of slide plate 40, orienting tabs 52 and 53 will extend through openings 47 and 48 in rear storage compartment wall 10 and into aligned openings 30 and 32 of storage box 18. However, due to the offset relationship of openings 30 and 32 with respect to the bottom wall 24 of storage box base 19 and their offset relationship with respect to end walls 20 and 21, storage box 18 can only be placed in one position within storage compartment 5, to enable orienting tabs 52 and 53, and in particular forward legs 50 and 51 thereof, to pass through openings 47 and 48 and enter openings 30 and 32. Thus, if storage box 18 is placed within storage compartment 5 in any other position than the single correct oriented position, slide plate 40 will not move into the latched position of FIGS. 3 and 5 since the ends of tab legs 50 and 51 will abut against the solid sidewalls of the storage box lid preventing the locking of slide plate 40.

Thus, when storage box 18 is properly positioned in storage compartment 5, slide lock 40 will move into position partially over top access opening 16 as shown in FIGS. 3 and 5 which securely locks storage box 18 within the storage compartment preventing its removal therefrom, until locking projections 45 are disengaged from tabs 37 by use of a manually operated key 55 (FIG. 7). Inserting tangs 56 of key 55 through openings 57 in slide plate 40, in the same manner as that described in U.S. Pat. No. 4,834,238, will enable slide plate 40 to be moved to the unlocked position of FIGS. 2 and 4. Thus, orienting tabs 52 and 53 ensure that storage box 18 is properly oriented within storage compartment 5 in only a single position, since tabs 52 and 53 will abut the sidewalls of lid 25 preventing closure of slide plate 40. Thus, graphics cards 51, which are always located in the same position within storage box 18, will always be arranged in the proper orientation with respect to security package 1 for viewing through access opening 16 and bottom wall cutout 13.

Thus, security package 1 provides a reusable, low cost, sturdy device for display of compact discs in a secured package in retail stores, and which allows a perspective purchaser to browse through the compact discs and easily view the graphics information cards contained therein.

If desired, orienting tabs 52 and 53 could easily be mounted on the bottom of a slide plate of the type shown in U.S. Pat. No. 4,589,549, eliminating the need for the slide plate to be integrally hingedly mounted on the storage compartment, thereby enabling the slide plate to be a separate component as shown in the above mentioned patent, without affecting the concept of the invention.

Accordingly, the compact disc security package of the present invention is simplified, provides an effective, safe, inexpensive, and efficient device which achieves all the enumerated objectives, provides for eliminating difficulties encountered with prior devices, and solves problems and obtains new results in the art.

In the foregoing description, certain terms have been used for brevity, clearness and understanding; but no unnecessary limitations are to be implied therefrom beyond the requirement of the prior art, because such terms are used for descriptive purposes and are intended to be broadly construed.

Moreover, the description and illustration of the invention is by way of example, and the scope of the invention is not limited to the exact details shown or described.

Having now described the features, discoveries and principles of the invention, the manner in which the improved compact disc security package is constructed and used, the characteristics of the construction, and the advantageous, new and useful results obtained; the new and useful structures, devices, elements, arrangements, parts and combinations, are set forth in the appended claims.

We claim:

1. In combination, a box and a security package formed with a storage compartment for receiving and securely holding said box in a properly oriented position within said storage compartment, said box having a plurality of walls, one of which is formed with an opening; said security package having a main housing with a plurality of walls forming a storage compartment therebetween and forming an access opening for inserting and removing the box into and out of the compartment; lock means for releasably securing the box in the storage compartment, said lock means including a lock plate mounted on the housing and movable between locked and unlocked positions, said lock plate when in the locked position extends over a portion of the access opening to prevent removal of the box from the storage compartment; locking projections formed on the security package engageable with the lock plate for retaining said plate in locked position; tab means formed on the lock plate and movable into the storage compartment and into the opening formed in the box wall when the lock plate is moved to a locked position for in the storage compartment.

2. The combination defined in claim 1 including key means engageable with the locking projections for moving said projections out of engagement with the lock plate enabling said plate to be moved to the unlocked position.

3. The combination defined in claim 2 in which one of the housing storage compartment-forming walls is a transversely-extending rear wall; in which an opening is formed in the rear wall and aligns with the tab means of the lock plate; and in which the tab means extends through said rear wall opening when the lock plate is in locked position and into the opening formed in the box wall.

4. The combination defined in claim 3 in which the tab means includes a pair of spaced tabs formed on an underside surface of the lock plate; and in which a pair of spaced openings are formed in the rear wall of the housing for receiving the pair of tabs therethrough when the lock plate is in locked position.

5. The combination defined in claim 2 in which the housing includes a lock housing portion formed by the rear wall of the storage compartment and a lock housing wall spaced from and parallel to said rear wall; and in which the tab means is located within the lock housing portion when the lock plate is in the unlocked position.

* * * * *